United States Patent
Gayrard et al.

(10) Patent No.: US 10,673,974 B2
(45) Date of Patent: Jun. 2, 2020

(54) TELECOMMUNICATION SYSTEM COMPRISING A CACHE SERVER LOCATED ON BOARD A HIGH-ALTITUDE PLATFORM AND ASSOCIATED DATA-TRANSMITTING METHOD

(71) Applicant: THALES, Courbevoie (FR)

(72) Inventors: Jean-Didier Gayrard, Toulouse (FR); Walter Zoccarato, Toulouse (FR)

(73) Assignee: THALES, Courbevoie (FR)

( * ) Notice: Subject to any disclaimer, the term of this patent is extended or adjusted under 35 U.S.C. 154(b) by 15 days.

(21) Appl. No.: 16/007,965

(22) Filed: Jun. 13, 2018

(65) Prior Publication Data

US 2018/0367638 A1 Dec. 20, 2018

(30) Foreign Application Priority Data

Jun. 15, 2017 (FR) ...................... 17 00644

(51) Int. Cl.
| | |
|---|---|
| *H04L 29/08* | (2006.01) |
| *H04B 7/185* | (2006.01) |
| *H04W 72/04* | (2009.01) |
| *H04L 5/14* | (2006.01) |
| *H04W 72/12* | (2009.01) |
| *H04W 74/04* | (2009.01) |
| *H04L 5/00* | (2006.01) |
| *H04W 84/06* | (2009.01) |
| *H04J 1/00* | (2006.01) |
| *H04J 3/00* | (2006.01) |
| *H04W 84/04* | (2009.01) |

(52) U.S. Cl.
CPC ..... *H04L 67/2842* (2013.01); *H04B 7/18504* (2013.01); *H04B 7/18513* (2013.01); *H04B 7/18517* (2013.01); *H04L 5/0001* (2013.01); *H04L 5/14* (2013.01); *H04W 72/0446* (2013.01); *H04W 72/0453* (2013.01); *H04W 72/1263* (2013.01); *H04W 74/04* (2013.01); *H04J 1/00* (2013.01); *H04J 3/00* (2013.01); *H04W 84/047* (2013.01); *H04W 84/06* (2013.01)

(58) Field of Classification Search
CPC ..... H04L 67/2842; H04L 5/0001; H04L 5/14; H04B 7/18504; H04B 7/18513; H04B 7/18517; H04W 74/04; H04W 72/1263; H04W 72/0453; H04W 72/0446; H04W 84/047; H04W 84/06; H04J 3/00; H04J 1/00

See application file for complete search history.

(56) References Cited

U.S. PATENT DOCUMENTS

| | | | |
|---|---|---|---|
| 6,697,850 B1 | 2/2004 | Saunders | |
| 8,432,808 B1 * | 4/2013 | Dankberg | H04L 67/325 370/235 |

(Continued)

FOREIGN PATENT DOCUMENTS

EP  3 010 162 A1  4/2016

*Primary Examiner* — Joshua Kading
(74) *Attorney, Agent, or Firm* — Baker & Hostetler LLP

(57) ABSTRACT

A satellite-based very-high-throughput system is provided and a web-caching system based on a high-altitude platform station, an aerostat for example, having the advantage of decreasing the throughput required over the feeder link without however requiring a cache server to be installed on board the satellite.

12 Claims, 10 Drawing Sheets

(56) References Cited

U.S. PATENT DOCUMENTS

| | | | |
|---|---|---|---|
| 2011/0246518 A1* | 10/2011 | Mehrotra | H04L 67/2842 |
| | | | 707/770 |
| 2016/0057245 A1* | 2/2016 | Bavandpouri | H04L 67/2842 |
| | | | 709/213 |
| 2016/0080069 A1 | 3/2016 | Horvitz et al. | |
| 2017/0195450 A1* | 7/2017 | Su | H04L 65/4076 |
| 2019/0089454 A1* | 3/2019 | Welle | H04B 7/18521 |

* cited by examiner

TELECOMMUNICATION SYSTEM COMPRISING A CACHE SERVER LOCATED ON BOARD A HIGH-ALTITUDE PLATFORM AND ASSOCIATED DATA-TRANSMITTING METHOD

CROSS-REFERENCE TO RELATED APPLICATIONS

This application claims priority to foreign French patent application No. FR 1700644, filed on Jun. 15, 2017, the disclosure of which is incorporated by reference in its entirety.

FIELD OF THE INVENTION

The invention relates to the field of satellite-based very-high-throughput systems or geostationary-satellite-based communication systems for broadband Internet access. This field includes very-high-throughput satellite (VHTS) systems.

The invention relates to a telecommunication system comprising, on board a high-altitude platform, a cache server for complementing a satellite-based very-high-throughput system. The invention may be used, in broadband Internet access systems that provide multibeam coverage and that for example operate in the Ka band (20/30 GHz), to decongest the feeder link that ensures the transmission, between feeder ground stations and the satellite, of all of the information intended for user terminals.

In the rest of the description, the expression "station" means one or more transmitters or receivers or a combination of transmitters and receivers, including the accessory equipment, necessary at one location for carrying on a radiocommunication service.

The expression "high-altitude platform station" (HAPS) means a station located on an object placed at an altitude, for example higher than 18 km, and at a specified, nominal and fixed point relative to the Earth. The object may, for example, be an aerostat.

The expression "gateway station" is understood to mean a station intended to provide a communication link to a high-altitude platform station and to interface with a local terrestrial network.

The expression "feeder station" is understood to mean a ground station intended to provide feeder links to the satellite and to interface with the Internet and/or a local terrestrial network.

BACKGROUND

In satellite-based very-high-throughput systems, the feeder link between the ground feeder station and the satellite is a bottleneck because all the digital data intended for users and generated by users pass over this feeder link connecting the feeder station to the satellite.

Thus, for example, a satellite-based very-high-throughput system operating in the Ka band (20/30 GHz) having a zone of coverage made up of 200 spot beams, with a bandwidth of 1.4 GHz allocated to each spot, is able to transmit, to users, on average more than 500 Gbits/second (average spectral efficiency of 1.8b/s/Hz). The feeder link must therefore allow more than 500 Gbits/second to be transmitted to the satellite, this being a considerable throughput for a radiofrequency link. The frequency bands allocated to the feeder links of geostationary satellites by the International Telecommunication Union (ITU) do not exceed 2 GHz in the Ka band (20/30 GHz) and 5 GHz in the Q/V band (40/50 GHz).

There is therefore a problem to be solved with regard to decreasing the data flux that transits over the feeder link, in order not to exceed the available throughput resources.

One known way of solving the drawback related to excessive demands on the feeder link is based on increasing the bandwidth and/or data throughput of this link. This increase in resources may, for example, be achieved via a technique in which frequencies and polarizations are reused by several feeder stations that are distant from one another. Thus a satellite-based very-high-throughput system requiring a throughput of more than 500 Gbits/second over a Q/V-band feeder link may make use of more than about thirty feeder stations distributed over the zone of coverage.

Moreover, Q/V-band radiofrequency links through the atmosphere are very sensitive to the effects of attenuation and distortion of the signals due to bad weather (rain, snow, hail, etc.) and therefore these radiofrequency links are regularly inoperative. It is necessary to implement a site-diversity technique i.e. to install back-up and redundant feeder stations and to connect them to the other feeder stations via a terrestrial network. When a radiofrequency link generated by a given feeder station is inoperative because of bad weather, a back-up and redundant feeder station where the weather is good is activated to provide the feeder link to the satellite.

This solution is very expensive in terms of the initial investment required to install a great number of feeder stations and to connect them together via a fibre-optic network and in terms of operation and maintenance costs.

Another way of avoiding overuse of the feeder link is to use a web-caching technique to decrease the need in terms of data throughput of this link. All the content, and in particular videos, requested by the users of a satellite-based very-high-throughput system transits over the feeder link. Thus, the most popular content is retransmitted over the feeder link as many times as it is requested. Prospective studies show that video traffic will represent 70 to 80% of all Internet traffic by 2020. Measurements on terrestrial web-caching systems have shown that caching the most popular videos allows server traffic to be decreased by at least 50%. Transposing this result to a satellite-based very-high-throughput system, a 50% decrease in the need for feeder-link throughput is expected with the implementation of a web-caching system.

A web cache may be implemented in three locations in the system: in the user terminal, in the feeder station and in the satellite. The installation of a cache server in user terminals has a very small impact on the data throughput of the feeder link and it is, in general, already implemented in satellite-based very-high-throughput systems. The installation of a web-caching system in a feeder station has no impact on the throughput of the feeder link. Only the installation of a web-caching system on board the satellite allows decreasing the needs of data throughput of the feeder link.

Implementation of this solution, consisting in installing a web-caching system on board a satellite, has been described in U.S. Pat. No. 6,697,850 "Satellite-based communications system having an On-board Internet Web Proxy cache". This solution is very complex and expensive because it requires additional and specific hardware to be installed on board the satellite, such as multi-carrier demodulators for detecting requests generated by user terminals, a proxy server for analysing the requests, a cache server and its memory for storing and managing the content, modulators and multiplexes for transmitting, to the users, the cached content, and high-throughput demodulators for receiving, via the feeder link, the content to be cached. The deployment of such a solution has another drawback, namely it requires a new type of more complex and more expensive user terminal to be implemented.

SUMMARY OF THE INVENTION

In order to mitigate the drawbacks of the aforementioned solutions, the invention provides a satellite-based very-high-throughput system complemented by a web-caching system based on a high-altitude platform station, an aerostat for example.

The invention has the advantage of allowing the throughput required over the feeder link to be decreased without however requiring a cache server to be installed on board the satellite.

One subject of the invention is a telecommunication system comprising:
- at least one feeder ground station having access to at least one remote server,
- a satellite payload suitable for establishing a first communication link with at least one ground user and a second communication link with said at least one feeder station,
- at least one high-altitude platform station suitable for establishing a third communication link with the satellite payload and comprising a cache server comprising a memory,
- and at least one gateway ground station configured to enable communication between said at least one feeder ground station and said at least one high-altitude platform station,
- the telecommunication system being configured to save, in the memory, data, called popular data, originating from the remote server and liable to be requested a plurality of times by at least one user and to retransmit on request to at least one user popular data saved in the memory.

According to one particular aspect of the invention, said at least one feeder ground station is configured:
- to receive at least one request for data from a user,
- to determine whether the requested data are saved in the memory of a cache server of at least one high-altitude platform station,
- if the requested data are saved in the memory, to transmit the request to said at least one high-altitude platform station,
- if the requested data are not saved in the memory, to retrieve the requested data from at least one remote server and to determine whether the requested data are popular data,
- if the requested data are popular data, to transmit the requested data to at least one high-altitude platform station, and
- if the requested data are not popular data, to transmit the requested data to the user via the satellite payload.

According to one particular aspect of the invention, said at least one high-altitude platform station is configured to receive data to be cached in the memory of the cache server, to receive a request for access to data stored in the memory of the cache server and to transmit data stored in the memory of the cache server to at least one ground user via the satellite payload.

According to one particular aspect of the invention, the satellite payload is configured to retransmit, to said at least one feeder station, requests made by ground users, to aggregate data or signals emitted by said at least one feeder station and by said at least one high-altitude platform station and to retransmit, to said users, the aggregated data or aggregated signals.

According to one particular variant of the invention, the satellite payload comprises:
- at least one first receiver for receiving a signal emitted by said at least one feeder station and frequency converting the received signal,
- at least one second receiver for receiving a signal emitted by said at least one high-altitude platform station,
- at least one signal-aggregating device for frequency multiplexing the signals received by said at least one first receiver and the signals received by said at least one second receiver depending on the frequency at which they are intended to be retransmitted to a ground user, and
- at least one emitter for retransmitting the signals output from said at least one aggregating device to a ground user.

According to one particular variant of the invention, the satellite payload comprises:
- at least one first receiver for receiving data emitted by said at least one feeder station,
- at least one second receiver for receiving data emitted by said at least one high-altitude platform station,
- at least one routing device for multiplexing the data received by said at least one first receiver and the data received by said at least one second receiver depending on the ground user for whom they are intended,
- at least one signal-aggregating device for time-division multiplexing the data originating from said at least one routing device and intended for a ground user, and
- at least one emitter for retransmitting the data output from said at least one aggregating device to a ground user.

According to one particular aspect of the invention, said at least one gateway station and said at least one feeder station are interconnected by means of a local network or the Internet.

According to one particular aspect of the invention, said at least one high-altitude platform station and said at least one gateway station are suitable for establishing at least one two-way radiofrequency communication link.

According to one particular aspect of the invention, said at least one high-altitude platform station and the satellite payload are configured to establish at least one free-space optical communication link.

According to one particular aspect of the invention, said at least one feeder ground station and the satellite payload are configured to establish at least one radiofrequency two-way communication link.

According to one particular aspect of the invention, a stationary high-altitude platform is an aerostat equipped with propelling means in order to remain stationary about a specified, nominal and fixed point with respect to the Earth.

Another subject of the invention is a method for transmitting data by means of a telecommunication system comprising at least one feeder ground station having access to at least one remote server, a satellite payload suitable for establishing a first communication link with at least one ground user and a second communication link with said at least one feeder station, at least one high-altitude platform station suitable for establishing a third communication link with the satellite payload and comprising a cache server comprising a memory, and at least one gateway ground station configured to enable communication between said at least one feeder ground station and said at least one high-altitude platform station, said method comprising the following steps:

at least one feeder ground station receives a request for data from a user, said at least one feeder ground station determines whether the requested data are saved in the memory of a cache server of at least one high-altitude platform station, if the requested data are saved in the memory, said at least one feeder ground station transmits the request to said at least one high-altitude platform station, which transmits the data saved in memory to at least one ground user via the satellite payload, if the requested data are not saved in the memory, said at least one feeder ground station retrieves the requested data from at least one remote server and determines whether the requested data are popular data that are liable to be requested a plurality of times by at least one user, if the requested data are popular data, said at least one feeder ground station transmits the requested data to at least one high-altitude platform station that caches them in the memory of the cache server and transmits them to at least one ground user via the satellite payload, and if the requested data are not popular data, said at least one feeder ground station transmits the requested data to the user via the satellite payload.

BRIEF DESCRIPTION OF THE DRAWINGS

Other features and advantages of the present invention will become more clearly apparent on reading the following description with reference to the appended drawings, which show.

DETAILED DESCRIPTION

Figure 1:
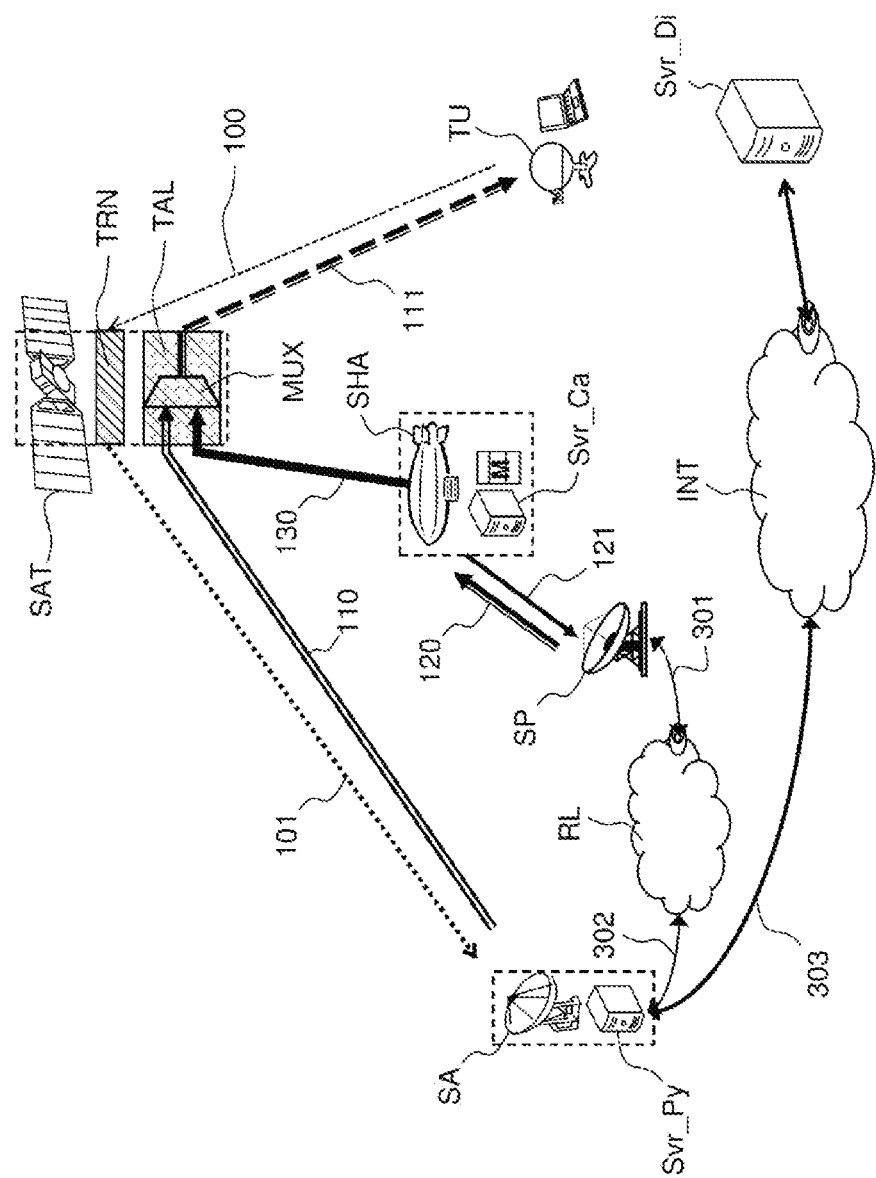
FIG. 1, a schematic of a communication system for broadband Internet access or satellite-based very-high-throughput system that is complemented by a web-caching system according to the invention.

FIG. 1 shows an example of a satellite-based very-high-throughput system comprising a cache server and its memory installed in a high-altitude platform station according to one embodiment of the invention.

In the example of FIG. 1, the system according to the invention comprises a high-altitude platform station SHA equipped with a cache server Svr_Ca comprising a cache memory M. The station SHA is able to communicate, on the one hand, with a local terrestrial network RL via a gateway ground station SP and, on the other hand, with one or more user terminals TU via the satellite SAT.

The high-altitude platform station SHA is equipped with a transmitting device for establishing a two-way radiofrequency link 120, 121 with a gateway station SP. The high-altitude platform station SHA is also equipped with a transmitting device for establishing a free-space optical link or laser link 130 with the satellite SAT. The high-altitude platform SHA is, for example, a stratospheric aerostat. It is provided with propelling means, typically a motor, allowing it to compensate for the force exerted by the wind in order to remain stationary about a specified, nominal, fixed point with respect to the Earth.

In addition, the system according to the invention comprises at least one gateway station SP that is able to communicate, on the one hand, with the high-altitude platform station SHA and, on the other hand, with at least one feeder station SA via a local network RL. The gateway station SP is equipped with a transmitting device for establishing a two-way radiofrequency link 120, 121 with the high-altitude platform station SHA. The gateway station SP is also connected, via a communication link 301, to the local network RL.

In addition, the system according to the invention comprises at least one feeder station SA that is equipped with a proxy server Svr_Py and that is able to communicate, on the one hand, with the local network RL and the Internet INT, and, on the other hand, with the user terminals TU via the satellite SAT. The proxy servers installed on various feeder stations are networked in order to communicate with one another. The feeder station SA is equipped with a transmitting device for establishing a two-way radiofrequency link 101, 110 with the satellite SAT. The feeder station SA is also equipped to establish a communication link 302 with the local network and another communication link 303 with the Internet. The radiofrequency uplink 110 between the feeder station SA and the satellite SAT is called the "forward" feeder link and is received by a "forward" transponder TAL of the satellite SAT. The radio downlink 101 between the satellite SAT and the feeder station SA is called the "return" feeder link and is emitted by an "return" transponder TRN of the satellite SAT.

In addition, the system according to the invention comprises a satellite SAT payload equipped with one or more "return" transponders TRN that are suitable for establishing a radio link 110 with at least one feeder station SA and a radio link 111 with user terminals TU, and one or more "forward" transponders TAL that are able to establish a radio link 101 with at least one feeder station SA, a laser link 130 with at least one high-altitude platform station SHA and a radio link 100 with the user terminals TU. A "forward" transponder is equipped with a device MUX for aggregating data streams, which aggregates the data conveyed by the radio link 110 and by the laser link 130 into a uniform data stream transmitted via the radio link 111.

In addition, the system according to the invention comprises a local terrestrial network RL that connects the feeder stations SA and the gateway stations SP to one another. In one particular embodiment of the invention, the local terrestrial network RL is the Internet INT.

In another variant embodiment of the invention, a plurality of high-altitude platform stations SHA that are each associated with a different gateway station SP are provided for a given satellite SAT. One advantage of this variant is that it allows a better management of the cache memory since advantage may be taken of a plurality of cache servers located in a plurality of stations.

The system according to the invention described in FIG. 1 allows popular data liable to be requested a plurality of times by one or more users to be cached in a cache server located on board a high-altitude platform station.

The expression "popular data" is employed to designate data that have a high popularity score, this score expressing the probability that these data will be requested again shortly by one or more users. Thus, a popular datum is a datum that is liable to be requested again in a future time interval of predefined duration.

The notion of popularity of data or of a content is used to select the content to be stored in memory and to judge whether they should be kept in memory. A popularity score is calculated on the basis of certain criteria. The criteria used are, for example, the frequency of user requests for transmission of a content, the time interval between two requests for transmission of an identical content, the binary size of a content, the nature of a content (video, image, sound, text), the age of a content.

The operation of the system according to the invention as regards the management of the caching of popular data will now be described.

Figure 2:
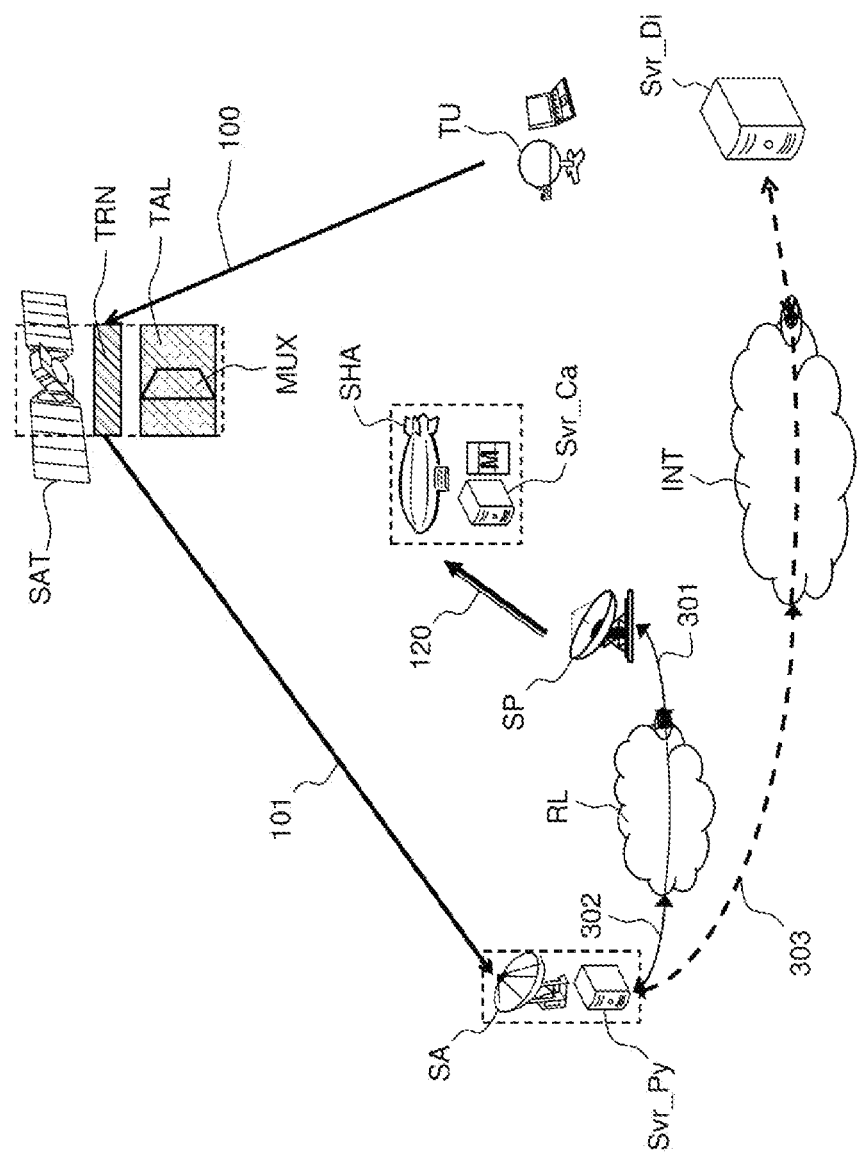
FIG. 2, a schematic of the routing of a request for a content by a user in the system according to the invention.

FIG. 2 shows, in the same example as that of FIG. 1, an example of routing, in the system according to the invention, of a request generated by a user terminal TU.

At a given time, the user terminal TU generates a request for content and transmits it to the proxy server Svr_Py of the feeder station SA via the "return" transponder TRN of the satellite SAT and the feeder station SA. The request is conveyed via the radiofrequency links 100 and 101. The proxy server Svr_Py analyses the request and determines whether the cache server Svr_Ca of the high-altitude platform SHA contains a valid copy of the requested content in its cache memory M. The example of FIG. 2 is limited to a single cache server, however, and as indicated above, a plurality of cache servers located on a plurality of stations located on different high-altitude platforms may be envisaged. If a plurality of cache servers coexist, the proxy server Svr_Py is configured to determine whether at least one of the available cache servers contains a valid copy of the requested content.

If the cache server Svr_Ca has a copy of the content saved in cache memory, the proxy server Svr_Py transmits the request to the cache server Svr_Ca via the local network RL and the gateway station SP. The request is conveyed via the communication link 302, via the local network RL, via the communication link 301 and via the radiofrequency link 120.

If the cache server Svr_Ca does not have a copy of the content in cache memory, the proxy server Svr_Py transmits the request to a remote server Svr_Di housing the content via the Internet. The request is conveyed via the communication link 303 and via the Internet.

Figure 3:
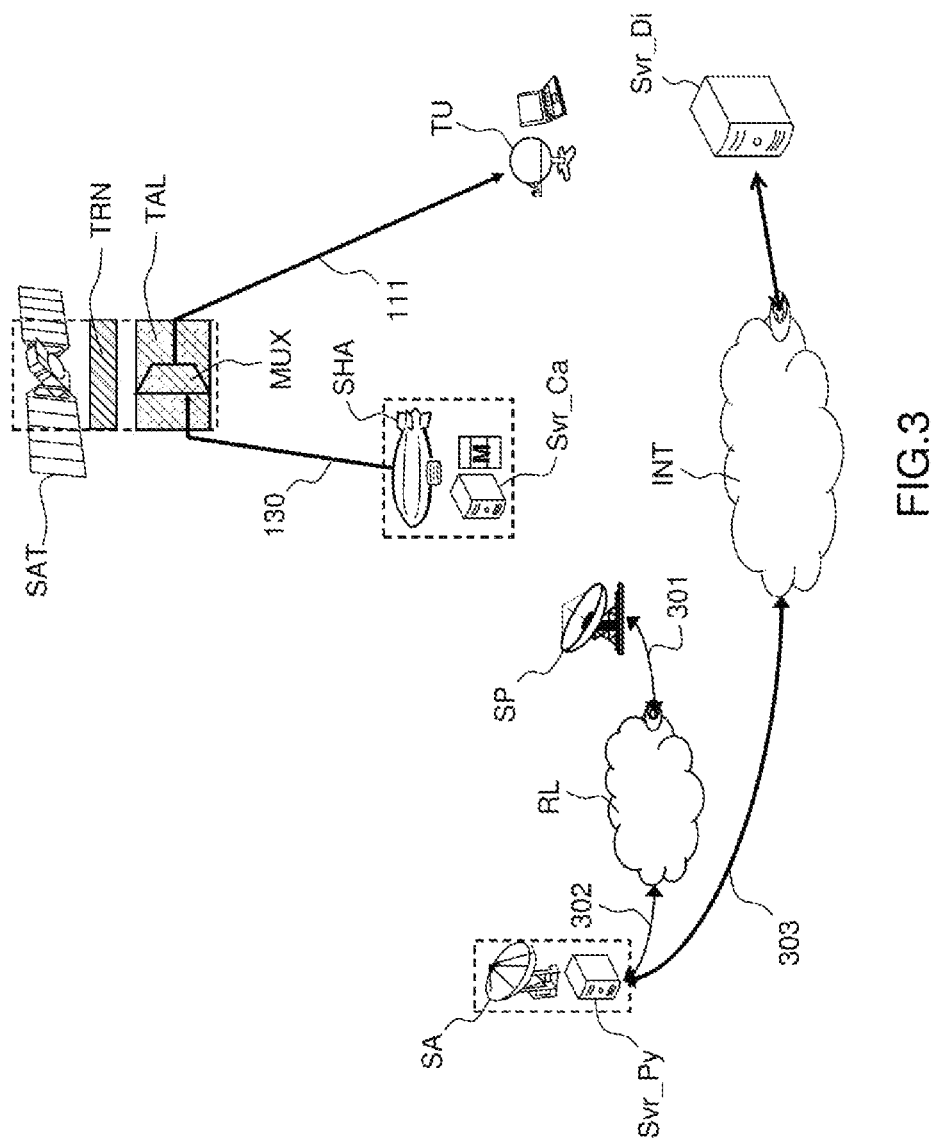
FIG. 3, a schematic of the routing of a requested content to an user in the system according to the invention in the case where the content is cached in the cache server located on the high-altitude platform.

FIG. 3 shows an example of the routing of a content requested by a user terminal TU in the system according to the invention in the case where the content is saved in the memory of the cache server Svr_Ca located in a high-altitude platform. The cache server Svr_Ca analyses the request and transmits the requested content to the user terminal TU via the "forward" transponder TAL of the satellite SAT. The "forward" transponder TAL is able to aggregate the data emitted by the station SHA with the data emitted by the feeder station SA over the feeder link 110. The content is conveyed by the laser link 130 and the radiofrequency link 111.

Figure 4:
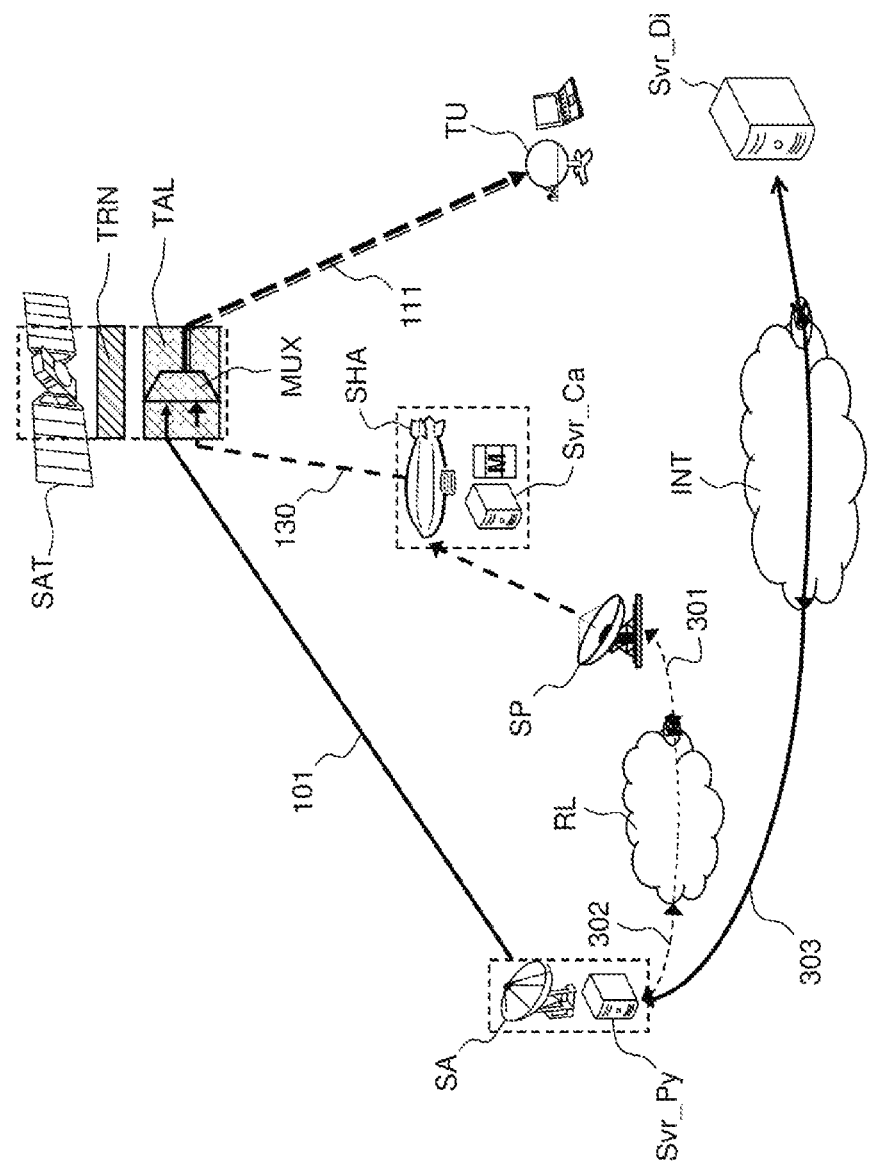
FIG. 4, a schematic of the routing of a requested content to an user in the system according to the invention in the case where the content is not cached.

FIG. 4 shows an example of the routing of a content requested by a user terminal TU in the system according to the invention in the case where the content is not saved in the memory of the cache server Svr_Ca located in a high-altitude platform.

In this case, the remote server Svr_Di transmits the requested content to the proxy server Svr_Py of the feeder station SA via the Internet and the communication link 303. The proxy server Svr_Py of the feeder station SA analyses the popularity of the content delivered by the remote server Svr_Di and evaluates whether it would be advantageous to cache this content in the memory of the cache server Svr_Ca located on the high-altitude platform.

If the content is not popular enough to justify caching it, the proxy server Svr_Py of the feeder station SA transmits the requested content to the user terminal TU via the "forward" transponder TAL of the satellite SAT. The content is conveyed via the radiofrequency links 110, 111.

If the content is popular enough to justify caching it, the proxy server Svr_Py of the feeder station SA transmits the content to the cache server Svr_Ca of the high-altitude platform via the local network RL and the gateway station SP. The content is conveyed via the communication link 302, the local network RL, the communication link 301 and the radiofrequency link 120. The cache server Svr_Ca stores the content in memory and transmits the requested content to the user terminal TU via the "forward" transponder TAL of the satellite SAT. The content is conveyed via the laser link 130 and the radiofrequency link 111.

Figure 5:
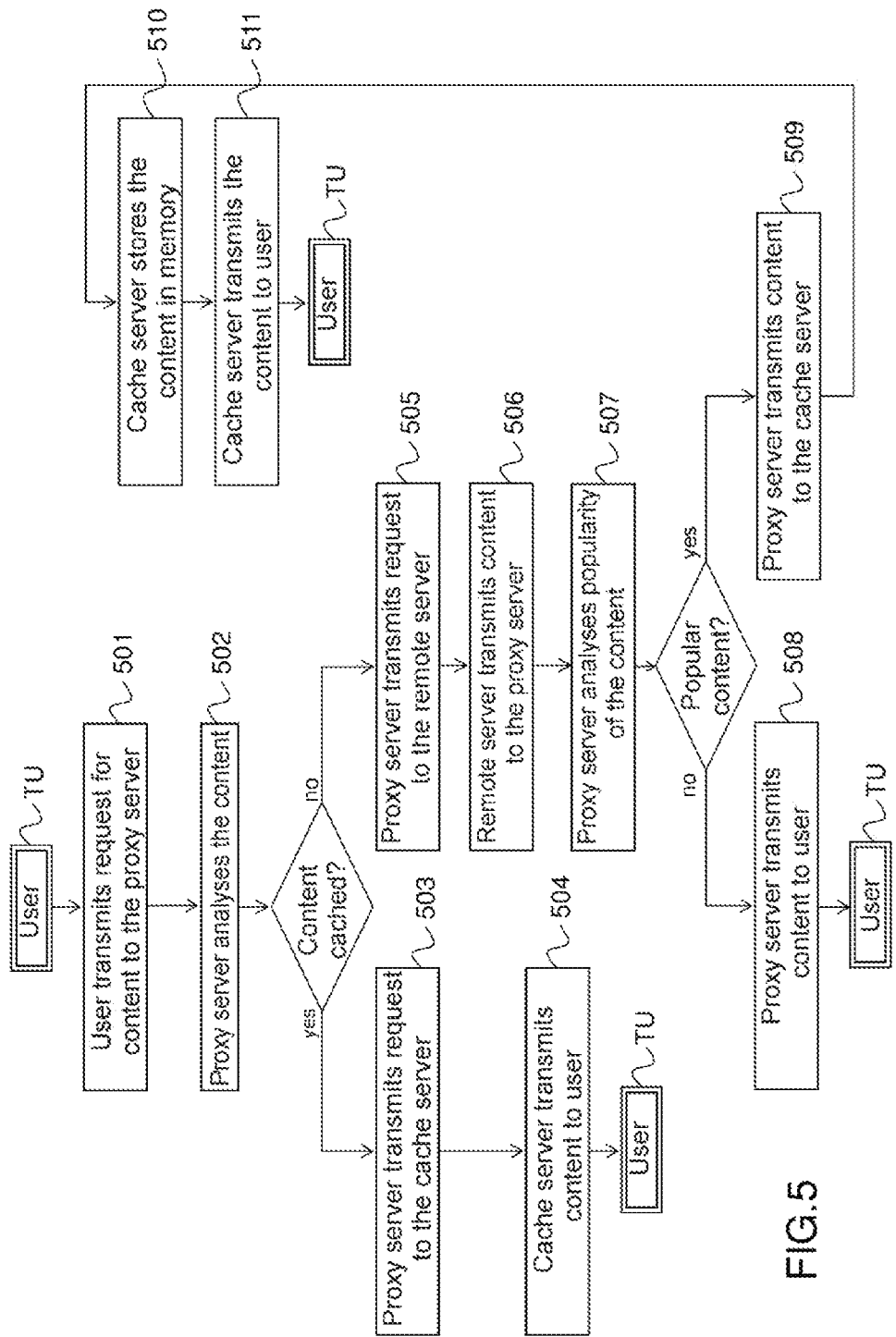
FIG. 5, a flowchart of the method for relaying requests and content between pieces of equipment and entities of the system according to the invention.

FIG. 5 shows, in a flowchart, the various steps of a method for transmitting data to a user terminal TU using the system according to the invention.

In a first step 501, a user terminal TU transmits a request for content to the proxy server Svr_Py of a feeder station SA via a satellite SAT. On reception of the request, the proxy server Svr_Py analyses 502 the request to determine whether the requested content is available or not in a cache memory of a cache server.

If the requested content is available in a cache memory of a cache server, then the proxy server Svr_Py transmits 503 the request to the cache server Svr_Ca located on board a high-altitude platform SHA. The cache server Svr_Ca then transmits 504 the requested content to the user terminal TU via the satellite SAT.

If the requested content is not available in the cache memory of any cache server, then the proxy server Svr_Py transmits 505 the request of the user to a remote server Svr_Di via the Internet. The remote server Svr_Di transmits 506 the requested content to the proxy server Svr_Py of the feeder station SA via the Internet. The proxy server Svr_Py then analyses 507 the popularity of the requested content.

If the requested content is not considered to be popular, then the proxy server Svr_Py transmits 508 this content to the user terminal TU via the feeder link 110 and the satellite SAT.

If the requested content is considered to be popular, then the proxy server Svr_Py transmits 509 the content to a cache server Svr_Ca located on board a high-altitude platform SHA for it to be cached. If a plurality of cache servers are available, the proxy server Svr_Py selects one thereof using, by way of criterion, for example, the remaining space available in each cache memory or the geographical origin of the request. The cache server Svr_Ca stores 510 in its cache memory the content transmitted by the proxy server Svr_Py, informs the proxy server Svr_Py thereof then transmits 511 the content to the user terminal TU via the satellite SAT.

FIG. 6 shows, in a schematic, an example of an architecture of a "forward" transponder TAL of the payload of a satellite SAT of the system according to a first embodiment of the invention.

A "forward" transponder TAL comprises a multibeam antenna system SAM for receiving the feeder-link radio signals emitted by N different feeder stations. The multibeam antenna system SIM comprises, for example, a separate antenna for each feeder link. The transponder TAL also comprises a plurality of receiving devices $REC_1$, $REC_k$, each receiving device being associated with one feeder link. The role of a receiving device $REC_1$, $REC_k$ is to amplify the radio signal, to frequency demultiplex the signal and to frequency transpose the signal to a frequency at which it is intended to be reemitted over the downlink of the satellite, to a ground user terminal. Over the feeder link 110, the signals are emitted according to a preset frequency plan. Each frequency or frequency sub-band in particular corresponds to a terrestrial spot comprising a plurality of terminals TU. Thus, the signals received by the transponder TAL over a given feeder link may include content transmitted at various frequencies, because intended for various users. The role of a receiving device $REC_1$, $REC_k$ is therefore to separate the received signals depending on their frequency over the feeder link 110, to transpose the signals to another frequency corresponding to the frequency plan over the downlink 100, then to transmit these signals to a stream-aggregating device $AGR_1$, $AGR_M$, $AGR_i$, $AGR_{i+M}$. For each spot of the zone of coverage to be covered, the role of a stream-aggregating device $AGR_1$, $AGR_M$, $AGR_i$, $AGR_{i+M}$ is to frequency multiplex the signals transmitted by the receiving device 31 on the one hand, and the signals transmitted by the demultiplexer DEMUX on the other hand. The multiplexed signals output from a stream-aggregating device $AGR_1$, $AGR_M$, $AGR_i$, $AGR_{i+M}$ are directed to the user antenna system SAU in order to be transmitted over the downlink 100.

The transponder TAL also comprises at least one reception chain associated with an optical link 130 with at least one high-altitude platform station SHA. This reception chain comprises one or more optical terminals TOP that are able to receive the optical signals, one or more optical/electrical receivers ROE that are able to convert the optical signals into electrical signals and a demultiplexing device DEMUX that is able to frequency demultiplex the received signals with a view to orienting them toward the stream-aggregating devices $AGR_1$, $AGR_M$, $AGR_i$, $AGR_{i+M}$ depending on the spot for which they are intended. If a plurality of high-altitude platform stations SHA are provided in the system, then the transponder TAL comprises as many reception chains as there are stations.

Figure 6A:
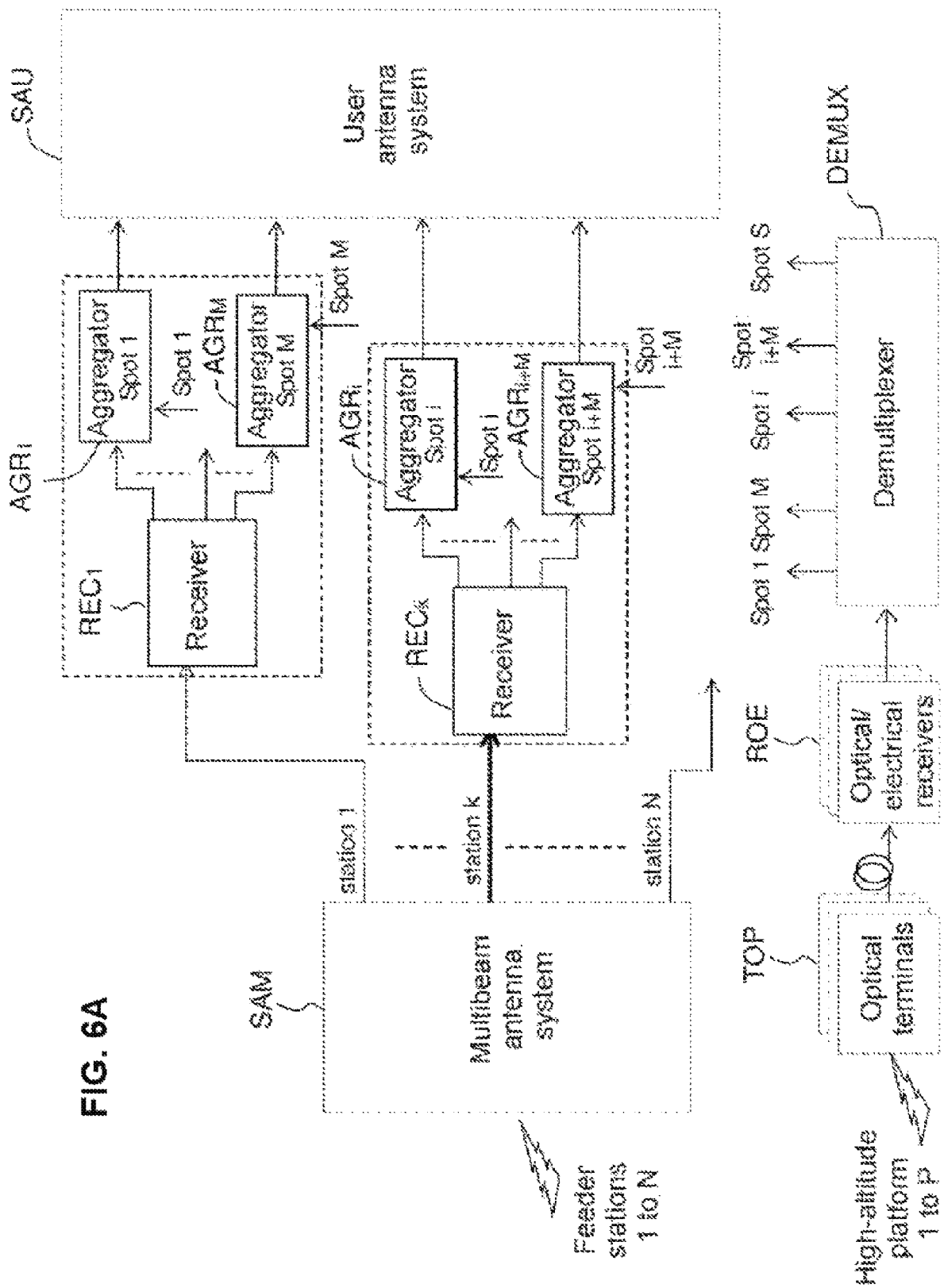
FIG. 6A, a schematic of a satellite payload comprising a transponder according to a first embodiment of the invention.
Figure 6B:
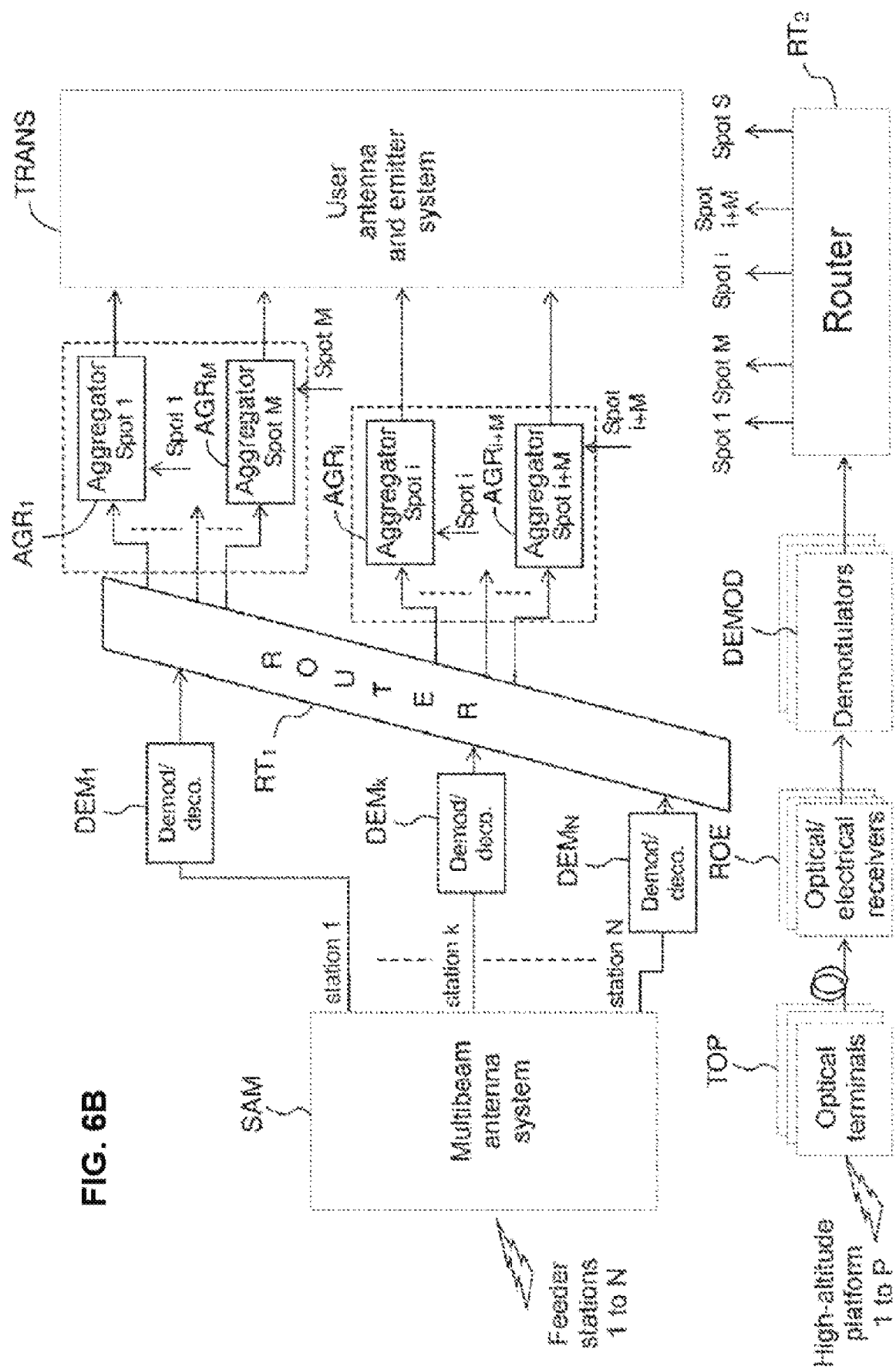
FIG. 6B, a schematic of a satellite payload comprising a transponder according to a second embodiment of the invention.

FIG. 6B shows, in a schematic, an example of an architecture of a "forward" transponder TAL of the satellite of the system according to a second embodiment of the invention. In this second embodiment, a "forward" transponder TAL again comprises a multibeam antenna system SAM for receiving the feeder-link radio signals emitted by N different feeder stations. The multibeam antenna system SAM comprises, for example, a separate antenna for each feeder link. The transponder TAL also comprises a plurality of receiving devices DEM1, DEMk, DEMN that are suitable for demodulating and decoding the received signals originating from each feeder link. Thus, each receiving device demodulates a radio signal in order to regenerate the digital data streams intended for the user terminals of each spot. The transponder TAL also comprises a first router $RT_1$ that is able to route the digital data streams to the various stream-aggregating devices AGR1, AGRM, AGRi, AGRi+M. In this second embodiment, the streams generated by the feeder stations and intended for the various spots, are routed depending on their destination, which is obtained directly by demodulating and decoding the received streams and no longer simply on the basis of the respective frequency plans of the uplink 110 and downlink 100. The transponder TAL thus includes a stream-aggregating device for each spot to be covered. Each stream-aggregating device AGR1, AGRM, AGRi, AGRi+M is able to time-division multiplex and synchronize the data streams originating from the receiving devices DEM1, DEMk, DEMN on the one hand, and, on the other hand, the data streams originating from the second router RT2 of the reception chain associated with the high-altitude platform stations. The multiplexed data streams are transmitted to a transmitting system TRANS comprising at least one coder/modulator for modulating the received digital data, a radio transmission chain and a plurality of user antennas for transmitting the generated signals to the various spots.

The transponder TAL also comprises at least one reception chain associated with an optical link 130 with at least one high-altitude platform station SHA. This reception chain comprises one or more optical terminals TOP that are able to receive the optical signals, one or more optical/electrical receivers ROE that are able to convert the optical signals into electrical signal, one or more demodulators DEMOD for demodulating the electrical signals in order to regenerate the digital data and a second router $RT_2$ that is able to route the received signals with a view to orienting them toward the stream-aggregating devices $AGR_1$, $AGR_M$, $AGR_i$, $AGR_{i+M}$ depending on the spot for which they are intended. The destination of a stream is determined by analysing demodulated digital data, this destination for example corresponding to the destination network address of data packets. In one variant embodiment of the invention, the first router $RT_1$ and the second router $RT_2$ are merged into one and the same router RT.

Figure 7A:
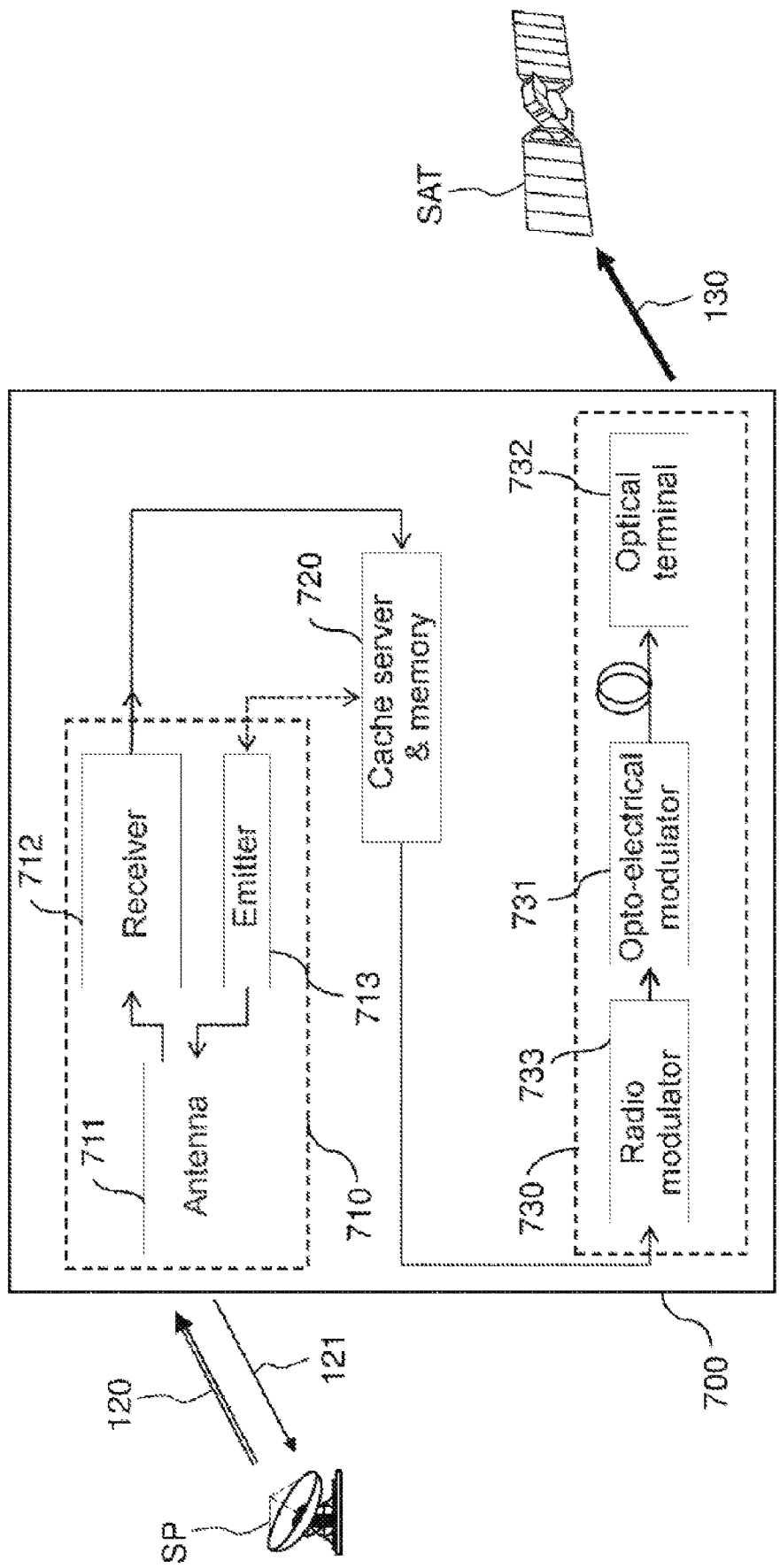
FIG. 7A, a schematic of a first example payload located on a high-altitude platform of a system according to the invention corresponding to the first embodiment of FIG. 6A.

FIG. 7A shows, in a schematic, an example of a payload of a high-altitude platform according to a first embodiment of the invention corresponding to the embodiment illustrated in FIG. 6A.

The payload 700 comprises at least one first payload 710 for gateway-station access, for communicating with a gateway ground station SP. The first payload 710 comprises at least one antenna 711, one receiver 712 and one emitter 713. The payload 701 also comprises a cache server and a memory 720. The receiver 712 is able to save data in the memory of the cache server.

The payload 700 furthermore comprises a second payload 730 for satellite access, for communicating with a "forward" transponder TAL of a satellite SAT. This second payload 730 comprises at least one radio modulator 733 that is able to retrieve digital data from the memory of the cache server 720 and to modulate these data in order to generate a radio signal. The radio modulator 733 is also configured to transpose the radio signal to a frequency band corresponding to the destination spot of the data, in the frequency plan of the downlink 100 linking the satellite SAT to the user terminals TU. The second payload 730 also comprises an opto-electrical modulator 731 that is able to convert the radio signal into an optical signal, and an optical terminal 732 for transmitting the optical signal to the satellite SAT.

Figure 7B:
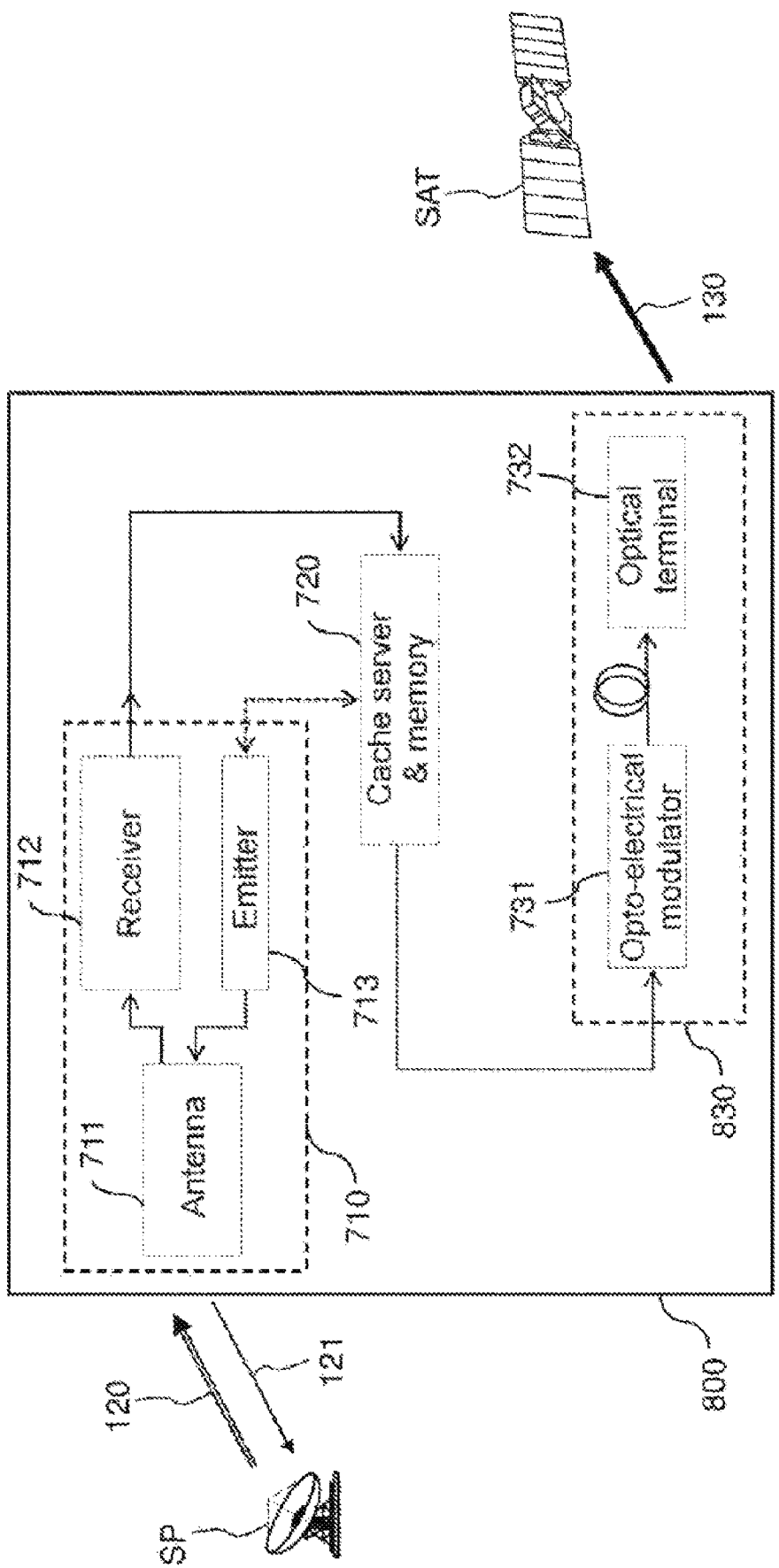
FIG. 7B, a schematic of a second example payload located on a high-altitude platform of a system according to the invention corresponding to the second embodiment of FIG. 6B.

FIG. 7B shows, in a schematic, an example of a payload 800 of a high-altitude platform according to a second embodiment of the invention corresponding to the embodiment illustrated in FIG. 6B. In this second embodiment, the radio modulator 733 has been removed because it is not necessary to transpose the signal to a frequency band corresponding to a destination spot because the generated optical signal is entirely demodulated on board the satellite in order to retrieve the digital data and to deduce therefrom the address of the destination spot.

Figure 8:
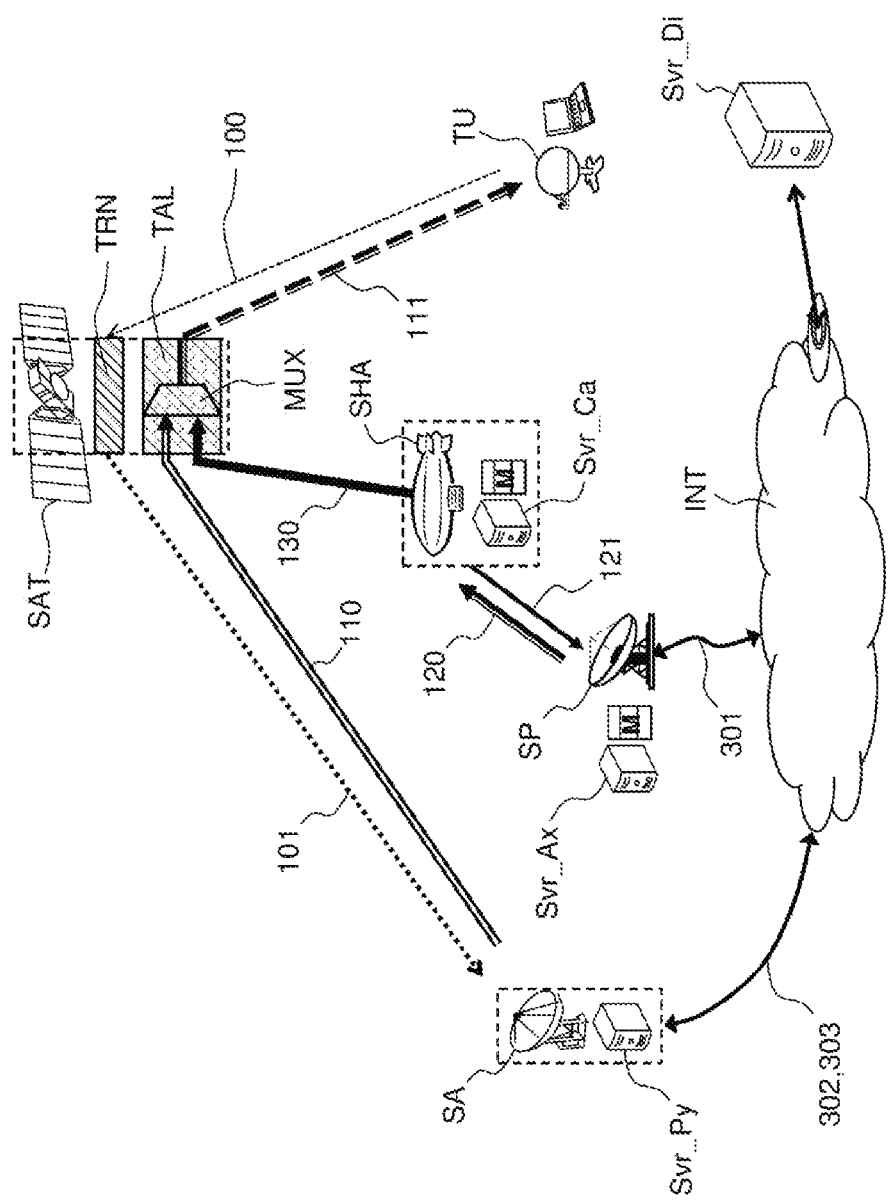
FIG. 8, a schematic of a variant embodiment of the system according to the invention presented in FIG. 1.

FIG. 8 schematically shows a variant embodiment of the system according to the invention presented in FIG. 1. In this variant, the local network RL is replaced by the Internet INT. In this case, a gateway station furthermore includes an auxiliary server Svr_Ax that is able to interface the gateway station with the Internet INT. The gateway station SP is controlled by a feeder station SA via the Internet INT.

The invention claimed is:

1. A telecommunication system comprising:
   at least one feeder ground station having access to at least one remote server,
   a satellite payload configured to establish a first communication link with at least one ground user and a second communication link with said at least one feeder station,
   at least one high-altitude platform station configured to establish a third communication link with the satellite payload and comprising a cache server comprising a memory, and
   and at least one gateway ground station configured to enable communication between said at least one feeder ground station and said at least one high-altitude platform station,
   the telecommunication system being configured to save, in the memory, popular data, originating from the remote server and liable to be requested a plurality of times by at least one user and to retransmit on request to at least one user popular data saved in the memory,
   wherein the satellite payload is configured to retransmit, to said at least one feeder station, requests made by ground users, to aggregate data or signals emitted by said at least one feeder station and by said at least one high-altitude platform station and to retransmit, to said uers, the aggregated data or aggregated signals.

2. The telecommunication system of claim 1, wherein said at least one feeder ground station is configured:
   to receive at least one request for data from a user,
   to determine, from among information previously received from said at least one high-altitude platform station, whether the requested data were previously saved in the memory of the cache server of at least one high-altitude platform station,
   when the requested data are saved in the memory, to transmit the request to said at least one high-altitude platform station,
   when the requested data are not saved in the memory, to retrieve the requested data from at least one remote server and to determine whether the requested data are popular data,
   when the requested data are popular data, to transmit the requested data to said at least one high-altitude platform station, for saving in the memory of the cache server, the at least one feeder ground station being further configured to receive information from said at least one high-altitude platform station about the saving of the requested data in the memory of the cache server, and
   when the requested data are not popular data, to transmit the requested data to the user via the satellite payload.

3. The telecommunication system of claim 1, wherein said at least one high-altitude platform station is configured to receive data to be cached in the memory of the cache server, to receive a request for access to data stored in the memory of the cache server and to transmit data stored in the memory of the cache server to at least one ground user via the satellite payload.

4. The telecommunication system of claim 1, wherein the satellite payload comprises:
   at least one first receiver for receiving a signal emitted by said at least one feeder station and frequency converting the received signal,
   at least one second receiver for receiving a signal emitted by said at least one high-altitude platform station,
   at least one signal-aggregating device for frequency multiplexing the signals received by said at least one first receiver and the signals received by said at least one second receiver depending on the frequency at which they are intended to be retransmitted to a ground user, and at least one emitter for retransmitting the signals output from said at least one aggregating device to a ground user.

5. The telecommunication system of claim 1, wherein the satellite payload comprises:
   at least one first receiver for receiving data emitted by said at least one feeder station,
   at least one second receiver for receiving data emitted by said at least one high-altitude platform station,
   at least one routing device for multiplexing the data received by said at least one first receiver and the data received by said at least one second receiver depending on the ground user for whom they are intended,
   at least one signal-aggregating device for time-division multiplexing the data originating from said at least one routing device and intended for a ground user, and
   at least one emitter for retransmitting the data output from said at least one aggregating device to a ground user.

6. The telecommunication system according to claim 1, wherein said at least one gateway station and said at least one feeder station are interconnected by means of a local network or the Internet.

7. The telecommunication system according to claim 1, wherein said at least one high-altitude platform station and said at least one gateway station are configured to establish at least one two-way radiofrequency communication link.

8. The telecommunication system according to claim 1, wherein said at least one high-altitude platform station and the satellite payload are configured to establish at least one free-space optical communication link.

9. The telecommunication system according to claim 1, wherein said at least one feeder ground station and the satellite payload are configured to establish at least one radiofrequency two-way communication link.

10. The telecommunication system according to claim 1, wherein a stationary high-altitude platform is an aerostat equipped with propelling means in order to remain stationary about a specified, nominal and fixed point with respect to the Earth.

11. A method for transmitting data by means of a telecommunication system comprising at least one feeder ground station having access to at least one remote server, a satellite payload configured to establish a first communication link with at least one ground user and a second communication link with said at least one feeder station, at least one high-altitude platform station configured to establish a third communication link with the satellite payload and comprising a cache server comprising a memory, and at least one gateway ground station configured to enable communication between said at least one feeder ground station and said at least one high-altitude platform station, said method comprising:
    saving, via the telecommunication system, in the memory, popular data, originating from the remote server and liable to be requested a plurality of times by at least one user;
    retransmitting, via the telecommunication system on request to at least one user, popular data saved in the memory;
    retransmitting, via the satellite payload to said at least one feeder station, requests made by ground user, to aggregate data or signals emitted by said at least one feeder station and by said at least one high-altitude platform station; and
    retransmitting, vai the sataellite payload to said users, the aggregated data or aggregated signals.

12. The method according to claim 11, further comprising:
    receiving, via at least one feeder ground station, a request for data from a user;
    determining, from among information previously received from said at least one feeder ground station, whether the requested data were previously saved in the memory of the cache server of said at least one high-altitude platform station;
    when the requested data are saved in the memory, transmitting, via said at least one feeder ground station, the request to said at least one high-altitude platform station, which transmits the data saved in memory to at least one ground user via the satellite payload;
    when the requested data are not saved in the memory, retrieving, via said at least one feeder ground station, the requested data from at least one remote server;
    when the requested daa are not saved in the memory, determining, via said at least one feeder ground station, whether the requested data are popular data that are liable to be requested a plurality of times by at least one user;
    when the requested data are popular data, transmitting, via said at least one feeder ground station, the requested data to said at least one high-altitude platform station for caching in the memory of the cache server, the at least one feeder ground station being configured to receive information from said at least one high-altitude platform station about the caching of the requested data in the memory of the cache server, and for transmitting to at least one ground user via the satellite payload; and
    when the requested data are not popular data, transmitting, via said at least one feeder ground station using the satellite payload, the reqeusted data to the user.

* * * * *

UNITED STATES PATENT AND TRADEMARK OFFICE
CERTIFICATE OF CORRECTION

PATENT NO.         : 10,673,974 B2
APPLICATION NO.    : 16/007965
DATED              : June 2, 2020
INVENTOR(S)        : Jean-Didier Gayrard et al.

It is certified that error appears in the above-identified patent and that said Letters Patent is hereby corrected as shown below:

In the Claims

In Claim 1, Column 11, Line 51, "to said uers" should be -- to said users --.
In Claim 11, Column 13, Line 26, "by ground user" should be -- by ground users --.
In Claim 12, Column 14, Line 16, "the requested daa" should be -- the requested data --.
In Claim 12, Column 14, Line 32, "the reqeusted data" should be -- the requested data --.

Signed and Sealed this
First Day of December, 2020

Andrei Iancu
*Director of the United States Patent and Trademark Office*